(12) United States Patent
Kim

(10) Patent No.: US 11,951,996 B2
(45) Date of Patent: Apr. 9, 2024

(54) DRIVER ASSISTANCE SYSTEM AND VEHICLE INCLUDING THE SAME

(71) Applicant: MANDO MOBILITY SOLUTIONS CORPORATION, Pyeongtaek-si (KR)

(72) Inventor: Deokju Kim, Seongnam-si (KR)

(73) Assignee: HL KLEMOVE CORP., Incheon (KR)

( * ) Notice: Subject to any disclaimer, the term of this patent is extended or adjusted under 35 U.S.C. 154(b) by 220 days.

(21) Appl. No.: 17/669,637

(22) Filed: Feb. 11, 2022

(65) Prior Publication Data

US 2022/0266840 A1 Aug. 25, 2022

(30) Foreign Application Priority Data

Feb. 19, 2021 (KR) .......................... 10-2021-0022647

(51) Int. Cl.
*B60W 40/00* (2006.01)
*B60T 7/12* (2006.01)
*B60T 8/1755* (2006.01)
*B60W 10/18* (2012.01)
*B60W 40/105* (2012.01)
(Continued)

(52) U.S. Cl.
CPC ........... *B60W 40/114* (2013.01); *B60T 7/122* (2013.01); *B60T 8/17558* (2013.01); *B60W 10/18* (2013.01); *B60W 40/105* (2013.01); *B60W 50/0205* (2013.01); *G06V 20/58* (2022.01); *G06V 20/588* (2022.01); *B60T 2201/022* (2013.01); *B60T 2250/03* (2013.01); *B60T 2250/04* (2013.01); *B60W 2520/06* (2013.01); *B60W 2520/14* (2013.01);
(Continued)

(58) Field of Classification Search
CPC .. B60W 40/105; B60W 40/114; B60W 10/18; B60W 10/184; G06V 20/28; G06V 20/288; B60T 7/122; B60T 8/17558
See application file for complete search history.

(56) References Cited

U.S. PATENT DOCUMENTS 11,801,824 B2 * 10/2023 Dalum .............. B60W 30/1888
2008/0167781 A1 * 7/2008 Labuhn .................. G08G 1/166
701/70
(Continued)

FOREIGN PATENT DOCUMENTS

JP 4848678 B2 * 12/2011
JP 6354282 B2 7/2018
(Continued)

*Primary Examiner* — Phutthiwat Wongwian
*Assistant Examiner* — Sherman D Manley
(74) *Attorney, Agent, or Firm* — Harvest IP Law, LLP

(57) ABSTRACT

Provided is a driver assistance system. The driver assistance system is provided in a vehicle.
The driver assistance system includes an image acquisition part configured to acquire image information about an obstacle; a yaw rate detector configured to detect a yaw rate of a vehicle body; and a controller configured to, when a shift lever is diagnosed as failure, recognize a rotation direction of the vehicle body based on the detected yaw rate of the vehicle body, recognize a position change of the obstacle in an image based on the acquired image information, and recognize whether a moving direction of the vehicle body is a backward direction or a forward direction based on the recognized rotation direction of the vehicle body and the recognized position change of the obstacle.

17 Claims, 8 Drawing Sheets

(51) Int. Cl.
*B60W 40/114* (2012.01)
*B60W 50/02* (2012.01)
*G06V 20/56* (2022.01)
*G06V 20/58* (2022.01)

(52) U.S. Cl.
CPC . *B60W 2552/53* (2020.02); *B60W 2554/4041* (2020.02); *B60W 2554/80* (2020.02)

(56) References Cited

U.S. PATENT DOCUMENTS

| | | | |
|---|---|---|---|
| 2013/0231825 A1* | 9/2013 | Chundrlik, Jr. | B60W 40/114 701/29.1 |
| 2014/0145498 A1* | 5/2014 | Yamakado | B60T 8/245 303/3 |
| 2017/0203757 A1* | 7/2017 | Ohbayashi | B62D 15/027 |
| 2017/0261318 A1* | 9/2017 | Takagi | G01C 3/085 |
| 2018/0162393 A1* | 6/2018 | Lee | B60T 8/17558 |
| 2019/0375401 A1* | 12/2019 | Shimizu | B60W 30/09 |
| 2020/0264606 A1* | 8/2020 | Kuwahara | B60W 60/0053 |
| 2023/0001919 A1* | 1/2023 | Hazama | B60W 30/09 |

FOREIGN PATENT DOCUMENTS

| | | |
|---|---|---|
| KR | 10-0771003 B1 | 10/2007 |
| KR | 10-1015407 B1 | 2/2011 |

\* cited by examiner (a)            (b)

(a)            (b)

DRIVER ASSISTANCE SYSTEM AND VEHICLE INCLUDING THE SAME

CROSS-REFERENCE TO RELATED APPLICATION

This application is based on and claims priority under 35 U.S.C. § 119 to Korean Patent Application No. 10-2021-0022647, filed on Feb. 19, 2021 in the Korean Intellectual Property Office, the disclosure of which is incorporated herein by reference.

BACKGROUND

1. Technical Field

The disclosure relates to a driver assistance system and a vehicle including the same to determine a collision with an obstacle.

2. Background Art

A variety of advanced driver assistance systems (ADAS) have been recently developed for an autonomous driving to improve driver's convenience and provide driving information of a vehicle for the prevention of accidents caused by driver negligence.

As an example, a technology of detecting obstacles around a vehicle using a distance sensor mounted on the vehicle and providing a driver with the detection result has been developed.

As another example, when a distance to another vehicle, which is obtained through an electromagnet mounted on a bumper of the vehicle, is within a predetermined value, a technology of determining it as a possible collision situation and supplying power to the electromagnet to generate magnetic force and automatically brake a vehicle, has been developed.

Despite the ADAS mounted on the vehicle for driver's safety and convenience, the risk of collision may vary depending on a change in driving environment such as the weight, speed and driving direction of a host vehicle and a speed and driving direction of another vehicle, as well as a change in surrounding environments such as the width of the road, the amount of traffic, and the number of bicycles and pedestrians, etc. Accordingly, a change in ADAS considering the above is required.

SUMMARY

An aspect of the disclosure provides a driver assistance system and a vehicle including the same that may recognize a driving direction of a first vehicle based on image information about a second vehicle acquired by the first vehicle and yaw rate information of the first vehicle, determine a collision with the second vehicle based on the recognized driving direction of the first vehicle and a relative speed of the second vehicle, and control braking in response to the collision determination.

Another aspect of the disclosure provides the driver assistance system and the vehicle including the same that may recognize the driving direction of the first vehicle based on the image information about the second vehicle acquired by the first vehicle and the yaw rate information of the first vehicle in the event of failure of a shift lever of the first vehicle.

According to an aspect of the disclosure, there is provided a driver assistance system, including: an image acquisition part configured to acquire image information about an obstacle; an obstacle detector configured to detect distance information about a distance to the obstacle; a yaw rate detector configured to detect a yaw rate of a vehicle body; a speed detector configured to detect speed information about a driving speed; and a controller configured to acquire relative speed information of the obstacle based on the detected distance information and the detected speed information, and control braking based on the acquired relative speed information, wherein, when controlling the braking, the controller is configured to recognize a rotation direction of the vehicle body based on the detected yaw rate of the vehicle body, recognize a position change of the obstacle in in an image based on the acquired image information, recognize whether a moving direction of the vehicle body is a backward direction based on the recognized rotation direction of the vehicle body and the recognized position change of the obstacle, and when it is determined that the moving direction of the vehicle body is the backward direction, restrict the braking.

According to an aspect of the disclosure, the controller is configured to acquire lane information and obstacle information on a road based on the acquired image information, and recognize the position change of the obstacle based on the acquired lane information and the acquired obstacle information, and the obstacle is a vehicle located in front of the vehicle body.

According to an aspect of the disclosure, the controller is configured to determine whether the vehicle is in a stationary state based on the detected distance information and the detected speed information, and when it is determined that the vehicle is in the stationary state, recognize a position change of the vehicle.

According to an aspect of the disclosure, the controller is configured to acquire object information in a stationary state based on the acquired image information, and recognize the position change of the obstacle based on the acquired object information in the stationary state.

According to an aspect of the disclosure, the controller is configured to recognize a rotation direction of the obstacle corresponding to the recognized position change of the obstacle, when the rotation direction of the obstacle is different from the recognized rotation direction of the vehicle body, recognize that the moving direction of the vehicle body is a forward direction, and when the rotation direction of the obstacle is the same as the recognized rotation direction of the vehicle body, recognize that the moving direction of the vehicle body is the backward direction.

According to an aspect of the disclosure, the controller is configured to, when the shift lever is in a normal state, recognize the moving direction of the vehicle body based on a gear signal received from a shift lever, and when the shift lever is in a failure state, recognize the moving direction of the vehicle body based on the detected yaw rate of the vehicle body and the image information.

According to another aspect of the disclosure, there is provided a driver assistance system, including: an image acquisition part configured to acquire image information about an obstacle; a yaw rate detector configured to detect a yaw rate of a vehicle body; and a controller configured to, when a shift lever is diagnosed as failure, recognize a rotation direction of the vehicle body based on the detected yaw rate of the vehicle body, recognize a position change of the obstacle in an image based on the acquired image information, and recognize whether a moving direction of the vehicle body is a backward direction or a forward direction based on the recognized rotation direction of the vehicle body and the recognized position change of the obstacle.

According to another aspect of the disclosure, the driver assistance system further includes: an obstacle detector configured to detect distance information about a distance to the obstacle; and a speed detector configured to detect speed information about a driving speed; wherein, when it is determined that the moving direction of the vehicle body is the backward direction, the controller is configured to acquire relative speed information of the obstacle based on the detected distance information and the detected speed information, and control to restrict braking based on the acquired relative speed information.

According to another aspect of the disclosure, the controller is configured to recognize a rotation direction of the obstacle corresponding to the recognized position change of the obstacle, when the rotation direction of the obstacle is different from the recognized rotation direction of the vehicle body, recognize that the moving direction of the vehicle body is the forward direction, and when the rotation direction of the obstacle is the same as the recognized rotation direction of the vehicle body, recognize that the moving direction of the vehicle body is the backward direction.

According to another aspect of the disclosure, the controller is configured to acquire lane information and obstacle information on a road based on the acquired image information, and recognize the position change of the obstacle based on the acquired lane information and the acquired obstacle information.

According to still another aspect of the disclosure, there is provided a vehicle, including: a brake system; an image acquisition part configured to acquire image information about an obstacle; a yaw rate detector configured to detect a yaw rate of a vehicle body; and a driver assistance system configured to recognize a rotation direction of the vehicle body based on the detected yaw rate of the vehicle body, recognize a position change of the obstacle in an image based on the acquired image information, recognize whether a moving direction of the vehicle body is a backward direction or a forward direction based on the recognized rotation direction of the vehicle body and the recognized position change of the obstacle, and when it is determined that the moving direction of the vehicle body is the backward direction, control to restrict braking of the brake system.

According to still another aspect of the disclosure, the vehicle further includes: an obstacle detector configured to detect distance information about a distance to the obstacle; and a speed detector configured to detect speed information about a driving speed; wherein, when it is determined that the moving direction of the vehicle body is the backward direction, the driver assistance system is configured to acquire relative speed information of the obstacle based on the detected distance information and the detected speed information, and control to restrict the braking based on the acquired relative speed information.

According to still another aspect of the disclosure, the vehicle further includes: a shift lever; and a lever signal receiver configured to receive a gear signal from the shift lever, wherein the driver assistance system is configured to diagnose a failure of at least one of the shift lever or the lever signal receiver based on gear information received from the lever signal receiver, and when the at least one is diagnosed as failure, recognize the moving direction of the vehicle body based on the recognized rotation direction of the vehicle body and the recognized position change of the obstacle.

According to still another aspect of the disclosure, the driver assistance system is configured to recognize the moving direction of the vehicle body based on the gear signal received in the lever signal receiver, when the shift lever is in a normal state.

According to still another aspect of the disclosure, the driver assistance system is configured to acquire lane information and obstacle information on a road based on the acquired image information, and recognize the position change of the obstacle based on the acquired lane information and the acquired obstacle information, and the obstacle is another vehicle located in front of the vehicle body.

According to still another aspect of the disclosure, the driver assistance system is configured to acquire object information in a stationary state based on the acquired image information, and recognize the position change of the obstacle based on the acquired object information in the stationary state.

According to still another aspect of the disclosure, the driver assistance system is configured to recognize a rotation direction of the obstacle corresponding to the recognized position change of the obstacle, when the rotation direction of the obstacle is different from the recognized rotation direction of the vehicle body, recognize that the moving direction of the vehicle body is the forward direction, and when the rotation direction of the obstacle is the same as the recognized rotation direction of the vehicle body, recognize that the moving direction of the vehicle body is the backward direction.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
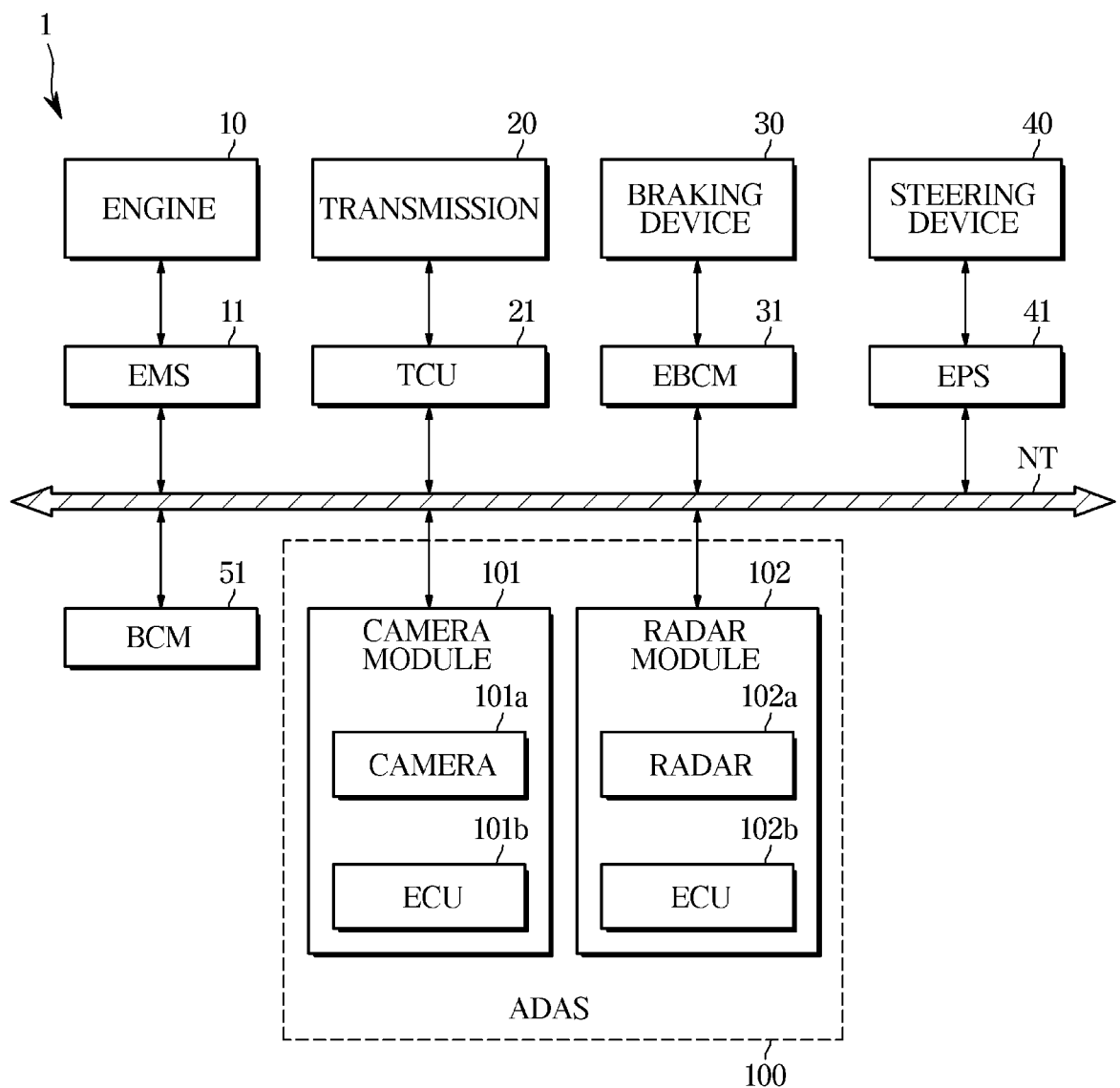
FIG. 1 is a block diagram illustrating a configuration of a vehicle according to an embodiment.

Like reference numerals throughout the specification denote like elements. Also, this specification does not describe all the elements according to embodiments of the disclosure, and descriptions well-known in the art to which the disclosure pertains or overlapped portions are omitted.

The terms such as "~part", "~member", "~module", "~block", and the like may refer to at least one process processed by at least one hardware or software. According to embodiments, a plurality of "~part", "~member", "~module", "~block" may be embodied as a single element, or a single of "~part", "~member", "~module", "~block" may include a plurality of elements.

It will be understood that when an element is referred to as being "connected" to another element, it can be directly or indirectly connected to the other element, wherein the indirect connection includes "connection" via a wireless communication network.

It will be understood that the terms "include" when used in this specification, specify the presence of stated features, integers, steps, operations, elements, and/or components, but do not preclude the presence or addition of one or more other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments will be described in detail with reference to the accompanying drawings.

FIG. 1 is a block diagram illustrating a configuration of a vehicle according to an embodiment.

The vehicle according to embodiments may perform a manual driving mode in which the vehicle is driven according to a driver's intention and an autonomous driving mode in which the vehicle autonomously travels to a destination based on current location information of the vehicle and destination information.

The vehicle according to embodiments may be an internal combustion engine vehicle or an environmentally friendly vehicle.

In the embodiment, the internal combustion engine vehicle is descried as an example.

As shown in FIG. 1, a vehicle 1 includes an engine 10, a transmission 20, a braking device 30, and a steering device 40.

The engine 10 includes a cylinder and a piston, and may generate power for driving the vehicle 1.

The transmission 20 includes a plurality of gears and may transmit the power generated by the engine 10 to vehicle wheels.

The braking device 30 may decelerate or stop the vehicle 1 through friction with the vehicle wheels.

The steering device 40 may change a driving direction of the vehicle 1.

The vehicle 1 may include a plurality of electronic components.

For example, the vehicle 1 further includes an engine management system (EMS) 11, a transmission control unit (TCU) 21, an electronic brake control module (EBCM) 31, an electronic power steering (EPS) 41, a body control module (BCM) 51, and the advanced driver assistance system (ADAS) 100.

The EMS 11 may control the engine 10 in response to a driver's acceleration intention through an accelerator pedal or a request from the ADAS 100. For instance, the EMS 11 may control a torque of the engine 10.

The TCU 21 may control the transmission 20 in response to a driver's shift command through a shift lever (also referred to as a gear lever, a shifting lever, or a gear shift) and/or a driving speed of the vehicle 1. For example, the TCU 21 may adjust a shift ratio from the engine 10 to the vehicle wheels.

The EBCM 31 may control the braking device 30 in response to a driver's braking intention through a brake pedal and/or wheel slip. For example, the EBCM 31 may temporarily release the wheel braking in response to the wheel slip detected when braking the vehicle 1 (anti-lock brake system, ABS).

The EBCM 31 may selectively release the wheel braking in response to oversteering and/or understeering detected when steering the vehicle 1 (electronic stability control, ESC).

Also, the EBCM 31 may temporarily brake the wheels in response to the wheel slip detected when driving the vehicle 1 (traction control system, TCS).

The EPS 41 may assist operations of the steering device 40 so that a driver may easily manipulate a steering wheel according to a driver's steering intention. For instance, the EPS 41 may assist the operations of the steering device 40 to decrease a steering force when driving at a low speed or when parking, and increase a steering force when driving at a high speed.

The BCM 51 may control operations of electronic components that provide convenience to the driver or secure the driver safety. For example, the BCM 51 may control a head lamp, a wiper, a cluster, a multifunction switch, a turn signal, and the like.

The ADAS 100 may assist the driver's operation (driving, braking, and steering). For instance, the ADAS 100 may detect an environment (e.g., other vehicles, pedestrians, cyclists, lanes, road signs, etc.) around the vehicle 1, and control driving and/or braking and/or steering of the vehicle 1 in response to the detected environment.

The ADAS 100 may provide the driver with a variety of functions. For example, the ADAS 100 may provide functions such as a lane departure warning (LDW), a lane keeping assist (LKA), a high beam assist (HBA), an autonomous emergency braking (AEB), a traffic sign recognition (TSR), a smart cruise control (SCC), a blind spot detection (BSD), and the like.

The ADAS 100 may include a collision avoidance device capable of outputting warning information about a collision with an obstacle for preventing and avoiding the collision with the obstacle.

The ADAS 100 may include an autonomous driving control device capable of automatically drive to a destination by recognizing a road environment, determining obstacles and driving states, travelling along a planned driving route while avoiding the obstacles.

The ADAS 100 may include a camera module 101 that acquires image data around the vehicle 1 and a radar module 102 that acquires data about obstacles around the vehicle 1.

The camera module 101 includes a camera 101a and an electronic control unit (ECU) 101b, and may photograph a front of the vehicle 1 and recognize other vehicles, pedestrians, cyclists, lanes, road signs, etc.

The radar module 102 includes a radar 102a and an ECU 102b, and may acquire a relative location, a relative speed, etc., of the obstacles (e.g., other vehicles, pedestrians, cyclists, etc.) around the vehicle 1.

The above-described electronic components may communicate with each other via a vehicle communication network (NT). For example, the electronic components may transmit/receive data through Ethernet, media oriented systems transport (MOST), FlexRay, controller area network (CAN), local interconnect network (LIN), and the like.

The ADAS 100 may transmit a driving control signal, a braking control signal, and a steering control signal to the EMS 11, the EBCM 31, and the EPS 41, respectively, through a vehicle communication network (NT).

Figure 2:
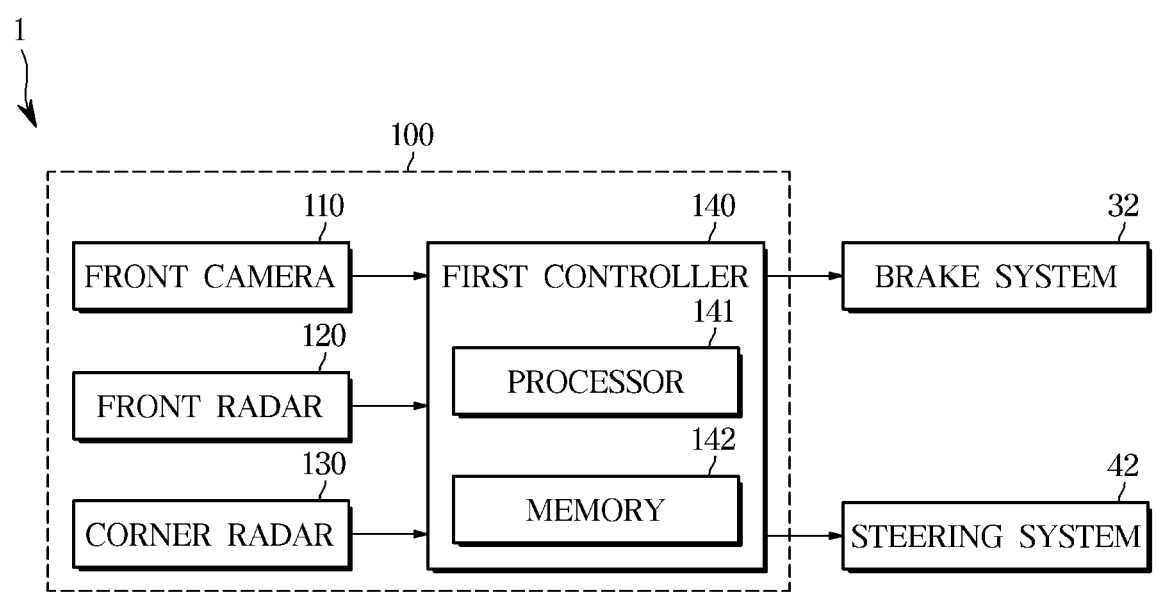
FIG. 2 is a block diagram illustrating a configuration of a driver assistance system in a vehicle according to an embodiment.
Figure 3:
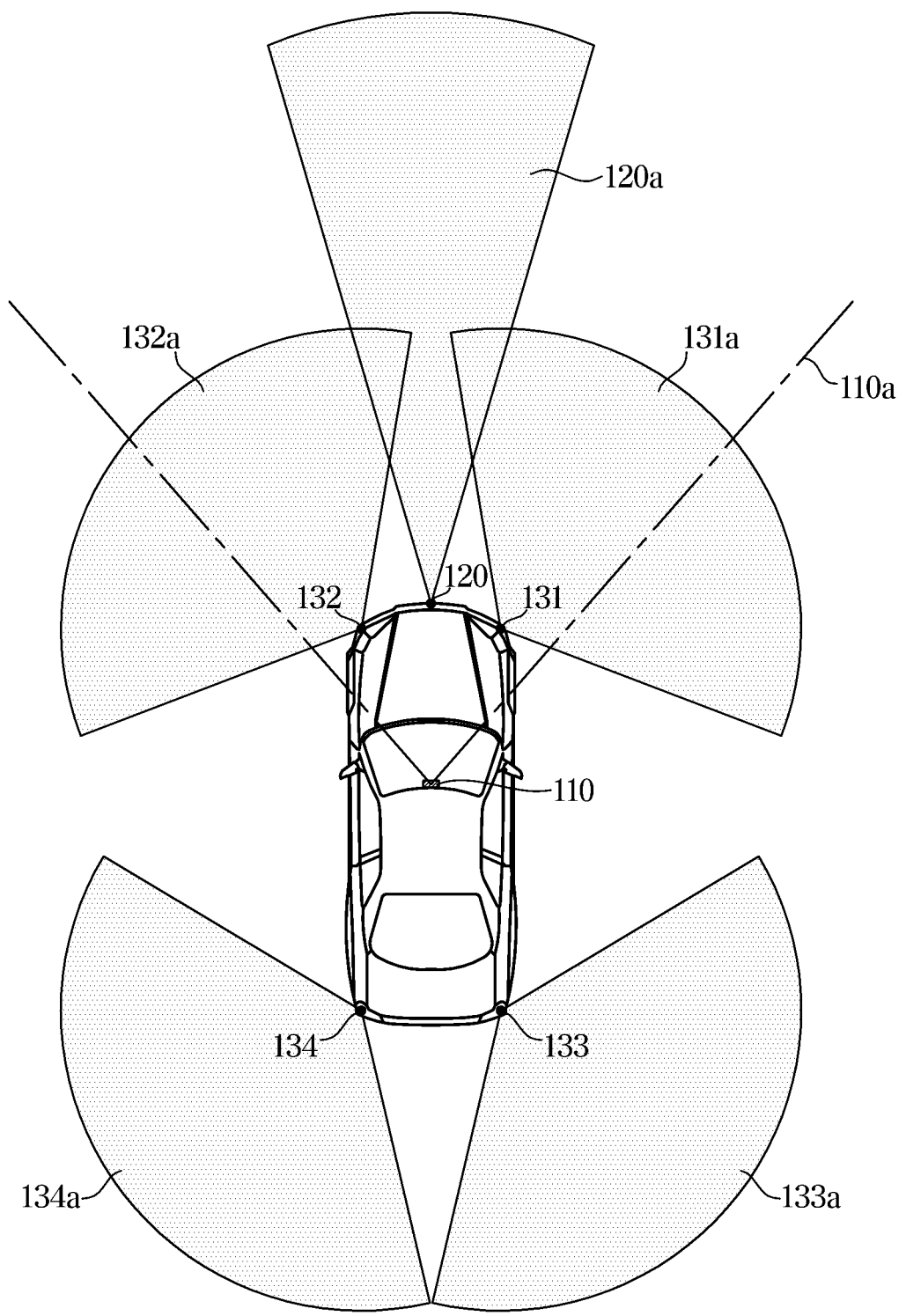
FIG. 3 is a diagram illustrating an example of detection areas of a camera and a radar included in a driver assistance system of a vehicle according to an embodiment.

FIG. 2 is a block diagram illustrating a configuration of an ADAS in a vehicle according to an embodiment. FIG. 3 is a diagram illustrating an example of detection areas of a camera and a radar included in an ADAS of a vehicle according to an embodiment.

The ADAS according to an embodiment may perform a collision avoidance function for preventing a collision with an obstacle during driving. In this instance, the ADAS may control braking for preventing the collision. That is, the ADAS according to an embodiment may be a collision avoidance device and a brake control device.

As shown in FIG. 2, the vehicle 1 may include a brake system 32, a steering system 42, and the ADAS 100.

The brake system 32 may include the EBCM 31 (refer to FIG. 1) and the braking device 30 (refer to FIG. 1), and the steering system 42 may include the EPS 41 (refer to FIG. 1) and the steering device 40 (refer to FIG. 1).

According to an embodiment, the ADAS 100 may include a front camera 110 as a camera of the camera module 101, a front radar 120 as a radar of the radar module 102, and a plurality of corner radars 130 (131, 132, 133 and 134).

As shown in FIG. 3, the ADAS 100 may include the front camera 110 to have a field of view 110a facing the front of the vehicle 1, the front radar 120 and the plurality of corner radars 130.

The front camera 110 may be installed on a front windshield of the vehicle 1.

The front camera 110 may photograph the front of the vehicle 1 and acquire image data of the front of the vehicle 1. The image data of the front of the vehicle 1 may include location information about at least one of another vehicle, pedestrians, cyclists, lanes, curbs, guardrails, street trees, streetlamps, etc., located in front of the vehicle 1.

The front camera 110 may include a plurality of lens and image sensors. The image sensors may include a plurality of photodiodes converting light into an electrical signal, and the plurality of photodiodes may be arranged in a two-dimensional (2D) matrix.

The front camera 110 may be electrically connected to a first controller 140. For instance, the front camera 110 may be connected to the first controller 140 via a vehicle communication network (NT), a hard wire, or a printed circuit board (PCB).

The front camera 110 may transmit the image data of the front of the vehicle 1 to the first controller 140.

The front radar 120 may have a field of sensing 120a facing the front of the vehicle 1. For example, the front radar 120 may be installed in a grille or a bumper of the vehicle 1.

The front radar 120 may include a transmission antenna (or a transmission antenna array) that transmits a transmission wave toward the front of the vehicle 1, and a receiving antenna (or a receiving antenna array) that receives a reflected wave reflected from an obstacle.

The front radar 120 may acquire front radar data from the transmission wave transmitted by the transmission antenna and the reflected wave received by the receiving antenna.

The front radar data may include location information and speed information about the other vehicles, pedestrians or cyclists located in front of the vehicle 1.

The front radar 120 may calculate a relative distance to an obstacle based on a phase difference (or a time difference) between the transmission wave and the reflected wave, and calculate a relative speed of the obstacle based on a frequency difference between the transmission wave and the reflected wave.

For instance, the front radar 120 may be connected to the first controller 140 via a vehicle communication network (NT), a hard wire, or a PCB. The front radar 120 may transmit the front radar data to the first controller 140.

The plurality of corner radars 130 include a first corner radar 131 installed on a front right side of the vehicle 1, a second corner radar 132 installed on a front left side of the vehicle 1, a third corner radar 133 installed on a rear right side of the vehicle 1, and a fourth corner radar 134 installed on a rear left side of the vehicle 1.

The first corner radar 131 may have a field of sensing 131a facing the front right side of the vehicle 1, and may be installed on a right side of a front bumper of the vehicle 1.

The second corner radar 132 may have a field of sensing 132a facing the front left side of the vehicle 1, and may be installed on a left side of the front bumper of the vehicle 1.

The third corner radar 133 may have a field of sensing 133a facing the rear right side of the vehicle 1, and may be installed on a right side of a rear bumper of the vehicle 1.

The fourth corner radar 134 may have a field of sensing 134a facing the rear left side of the vehicle 1, and may be installed on a left side of the rear bumper of the vehicle 1.

Each of the first to fourth corner radars 131, 132, 133 and 134 may include a transmission antenna and a receiving antenna.

The first to fourth corner radars 131, 132, 133 and 134 may acquire first corner radar data, second corner radar data, third corner radar data, and fourth corner radar data, respectively.

The first corner radar data may include distance information and speed information about other vehicles, pedestrians, or cyclists, (hereinafter, referred to as "obstacle") located on the front right side of the vehicle 1.

The second corner radar data may include distance information and speed information about an obstacle located on the front left side of the vehicle 1.

The third and fourth corner radar data may include distance information and speed information about obstacles located on the rear right side or and the rear left side of the vehicle 1.

Each of the first to fourth corner radars 131, 132, 133 and 134 may be connected to the first controller 140 via a vehicle communication network (NT), a hard wire, or a PCB. Also, the first to fourth corner radars 131, 132, 133 and 134 may transmit the first to fourth corner radar data to the first controller 140, respectively.

The first controller 140 may include the ECU 101b (refer to FIG. 1) of the camera module 101 (refer to FIG. 1), and/or the ECU 102b (refer to FIG. 1) of the radar module 102 (refer to FIG. 1), and/or a separate integrated controller.

The first controller 140 may include a processor 141 and a memory 142.

The processor 141 may process front image data of the front camera 110, front radar data of the front radar 120, and corner radar data of the plurality of corner radars 130, and generate a braking signal and a steering signal for controlling the brake system 32 and the steering system 42, respectively.

For example, the processor 141 may include an image processor for processing the front image data of the front camera 110, and/or a digital signal processor for processing the radar data of the radars 120 and 130, and/or a micro control unit (MCU) for generating the braking signal and the steering signal.

The processor 141 may detect the obstacle (e.g. other vehicles, pedestrians, cyclists, lanes, curbs, guardrails, street trees, streetlamps, etc.) located in front of the vehicle 1, based on the front image data of the front camera 110 and the front radar data of the front radar 120.

Specifically, the processor 141 may acquire location information (distance and direction) and speed information (relative speed) of obstacles in front of the vehicle 1 based on the front radar data of the front radar 120. The processor 141 may acquire location information (direction) and type information (e.g. whether the obstacle is another vehicle, a pedestrian, a cyclist, a curb, a guardrail, a street tree, a streetlamp, etc.) of the obstacle in front of the vehicle 1 based on the front image data of the front camera 110.

Also, the processor 141 may match the obstacle detected by the front image data with the obstacle detected by the front radar data, and acquire the type information, the location information and the speed information of the obstacles in front of the vehicle 1 based on the matching result.

The processor 141 may generate the braking signal and the steering signal based on the type information, the location information and the speed information of the obstacles in front of the vehicle 1.

For instance, the processor 141 may calculate a time to collision (TTC) between the vehicle 1 and an obstacle in front of the vehicle 1 based on the location information (relative distance) and speed information (relative speed) of the front obstacles, and provide a driver with a warning about a collision, or transmit the braking signal to the brake system 32 or the steering signal to the steering system 42, based on a comparison result between the TTC and a predetermined reference time.

The processor 141 may control an audio and/or a display to output a warning in response to a TTC less than a first predetermined reference time.

In response to the TTC less than a second predetermined reference time, the processor 141 may transmit a pre-braking signal to the brake system 32.

In response to the TTC less than a third predetermined reference time, the processor 141 may transmit an emergency braking signal to the brake system 32. In this instance, the second reference time is less than the first reference time and the third reference time is less than the second reference time.

The processor 141 may transmit a steering signal to the steering system 42 based on direction information among location information of the front obstacles.

As another example, the processor 141 may calculate a distance to collision (DTC) based on the speed information (i.e. relative speed) of the front obstacles, and provide the driver with a warning about a collision or transmit the braking signal to the brake system 32, based on a comparison result between the DTC and a distance to the front obstacle.

The processor 141 may acquire location information (distance and direction) and speed information (relative speed) of lateral obstacles (front right, front left, rear right and rear left sides) of the vehicle 1 based on the corner radar data of the plurality of corner radars 130.

The memory 142 may store a program and/or data for the processor 141 to process image data, a program and/or data for the processor 141 to process radar data, and a program and/or data for processor 141 to generate the steering signal and/or the braking signal.

The memory 142 may temporarily store the image data received from the front camera 110 and/or the radar data received from the radars 120 and 130. Also, the memory 142 may temporarily store a processing result of the image data and/or the radar data by the processor 141.

The memory 142 may include a volatile memory such as a static random access memory (S-RAM) and dynamic random access memory (D-RAM), and a non-volatile memory such as a flash memory, a read only memory (ROM), an erasable programmable read only memory (EPROM), and the like.

Figure 4:
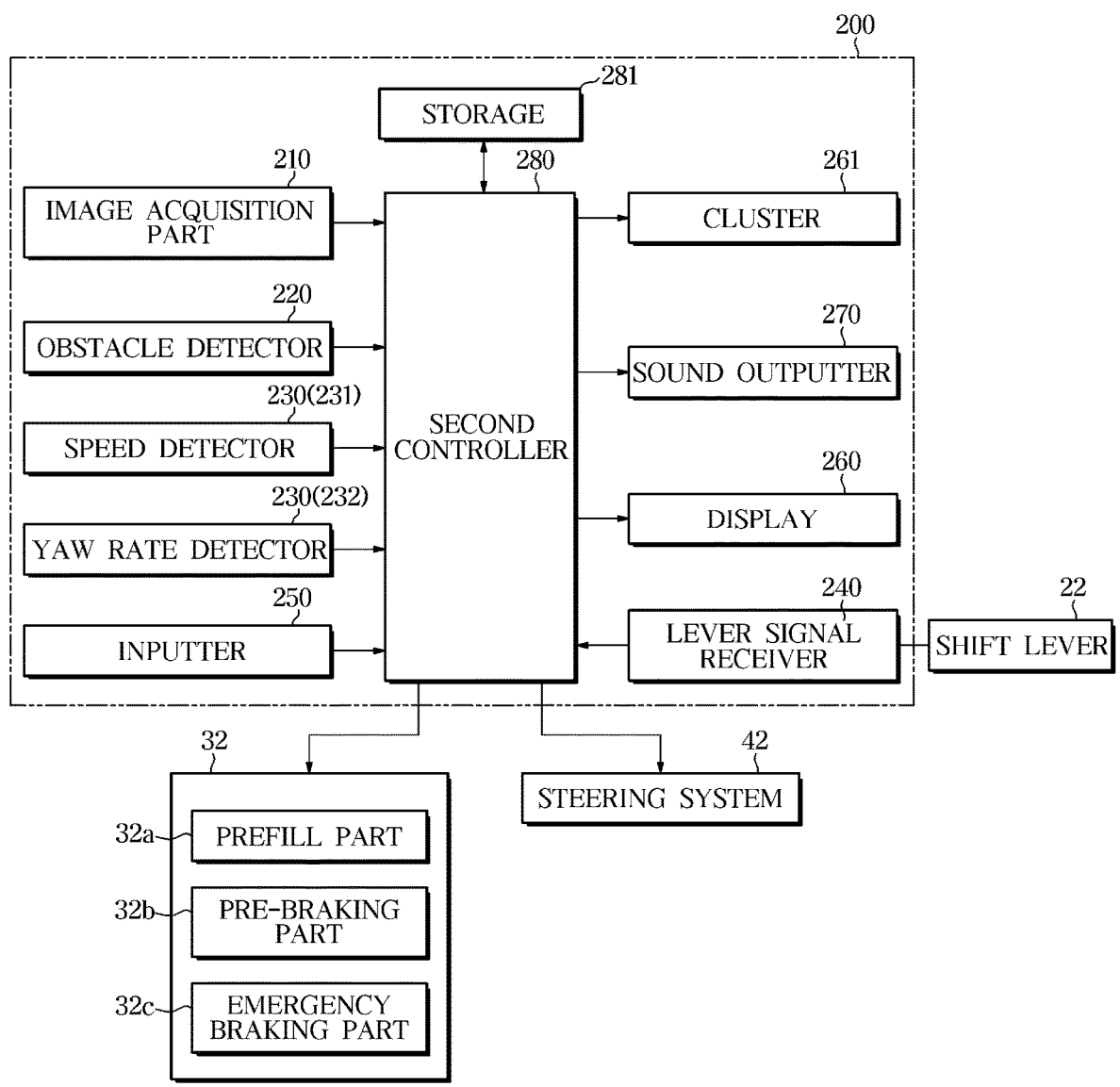
FIG. 4 is a block diagram illustrating a collision avoidance device of a driver assistance system in a vehicle according to an embodiment.

FIG. 4 is a block diagram illustrating a collision avoidance device 200 of the ADAS 100 in a vehicle according to an embodiment.

The collision avoidance device 200 of the ADAS 100 may include an image acquisition part 210, an obstacle detector 220, a driving information detector 230, a lever signal receiver 240, an inputter 250, a display 260, a cluster 261, a sound outputter 270, a second controller 280, and a storage 281, and also further include the brake system 32 and the steering system 42.

The image acquisition part 210 may acquire an image of a road, and transmit information about the acquired image to the second controller 280. Here, the information about the image may be image data.

The image acquisition part 210 may include the front camera 110, and acquire image information of the road and a shape of an obstacle from front image data photographed by the front camera 110.

The image acquisition part 210 may include a rear camera. The image acquisition part 210 may acquire image information of the road and a shape of an obstacle from rear image data photographed by the rear camera.

Here, the image information of the road may include an image of a lane and another vehicle.

Also, the shape of the obstacle may be information used for recognizing a type of the obstacle. Further, location information and speed information of the obstacle may be acquired from the image data photographed by the front camera 110.

The obstacle detector 220 may detect obstacles located in front and on the sides of a host vehicle and transmit obstacle information about the detected obstacles to the second controller 280. Here, the obstacle information may include location information about the obstacles, and the location information about the obstacles may include distance information to the obstacles and direction information of the obstacles. The distance information to the obstacle may be distance information about a relative distance to the obstacle.

The obstacle detector 220 may include the front radar 120 and the first and second corner radars 131 and 132.

Also, the obstacle detector 220 may include a light detection and ranging (lidar) sensor. The lidar sensor is a non-contact distance measurement sensor using a principle of laser radar. The lidar sensor may include a transmitter that transmits a laser and a receiver that receives the laser reflected back from a surface of an object existing within a sensor's range.

The obstacle detector 220 may include an ultrasonic sensor.

The ultrasonic sensor generates ultrasonic waves for a predetermined period of time and then detects a signal reflected back from an object. The ultrasonic sensor may be used to determine whether an obstacle such as a pedestrian exists within a short range.

The obstacle detector 220 may also detect an obstacle located in the rear of the host vehicle.

The vehicle may include the driving information detector 230 that detects driving information of the vehicle such as driving speed information, driving direction information and yaw rate information.

The driving information detector 230 may include a speed detector 231 and a yaw rate detector 232.

The speed detector 231 may include a plurality of wheel speed sensors. The speed detector 231 may include an acceleration sensor. The speed detector 231 may include the plurality of wheel speed sensors and the acceleration sensor.

When the speed detector 231 is the acceleration sensor, the second controller 280 may acquire an acceleration of the host vehicle based on information detected by the acceleration sensor, and also acquire a driving speed of the host vehicle based on the acquired acceleration.

When the speed detector 231 is the acceleration sensor and the plurality of wheel speed sensors, the second controller 280 may acquire the acceleration of the host vehicle based on information detected by the acceleration sensor, and acquire the driving speed of the host vehicle based on speed information acquired by the plurality of wheel speed sensors.

The yaw rate detector 232 may detect a yaw moment of the vehicle. The yaw rate detector 232 detects a rotational angular velocity that is a yaw rate in a vertical axis direction of the vehicle.

The yaw rate detector 232 may be provided in the vehicle, such as under a center console or a driver's seat, and the like, without being limited thereto.

The lever signal receiver 240 may receive a gear signal corresponding to a position of a shift lever (or a gear lever) provided inside the vehicle, and transmit the received gear signal to the second controller 280.

The gear signal may include a forward gear signal, a backward gear signal, a neutral gear signal, a parking gear signal, etc., and also include a stage signal for a gear stage.

The inputter 250 receives a user input.

The inputter 250 may receive the gear signal. The inputter 250 may receive a forward gear command, a backward gear command, a neutral gear command and a parking gear command. Also, the inputter 250 may transmit the forward gear signal, the backward gear signal, the neutral gear signal, and the parking gear signal for the received commands to the second controller 280.

The inputter 250 may include a shift button for receiving the forward gear command, the backward gear command, the neutral gear command and the parking gear command.

The inputter 250 may receive an operation command for one of functions that may be performed by the vehicle. For example, the inputter 250 may receive an operation command for at least one of a radio function, an audio function, a video function, a map display function, a navigation function, a digital multimedia broadcasting (DMB) function, a content playback function, and an Internet search function.

The inputter 250 may receive a user selection from a manual driving mode in which a driver directly drives the vehicle and an autonomous driving mode in which the vehicle automatically is driven, and transmit an input signal to the second controller 280.

The inputter 250 may receive destination information while the autonomous driving mode or a navigation mode is performed. The inputter 250 may also receive a desired driving speed in the autonomous driving mode.

The inputter 250 may receive a command to turn a collision avoidance notification mode on or off. The collision avoidance notification mode is for notifying a likelihood of collision with an obstacle.

The inputter 250 may be provided in a head unit or a center fascia of the vehicle, and also provided in a terminal for vehicle. The inputter 250 may be provided as a button, a key, a switch, an operation lever, a jog dial, or a touch pad.

The display 260 displays operation information about functions in operation. For example, the display 260 may display information related to a phone call, content output through a terminal (not shown), or music reproduction, and also display external broadcast information.

The display 260 may display map information, map information in which a route to a destination is matched, and route guidance information.

The display 260 may display the autonomous driving mode or the manual driving mode, and information about on and off of the collision avoidance notification mode.

The display 260 may display a road image and location information of a pedestrian.

The display 260 may display collision risk information notifying a collision with an obstacle as an image.

The display 260 may display deceleration information and steering information for avoiding the obstacle as an image.

The display 260 may display an image in response to a control command of the second controller 280, or turn on or off light.

The display 260 may also change a background color in response to the control command of the second controller 280. For example, the display 260 may change a background color in response to the control command of the second controller 280 in a collision risk situation.

The display 260 may be a lamp such as a light emitting diode (LED) or a flat panel display such as a liquid crystal display (LCD).

The display 260 may be a display panel provided in a terminal for vehicle.

The display 260 may include the cluster 261 provided in the vehicle.

The cluster 261 may display an image about the collision risk information or include a lamp for indicating the collision risk information. The cluster 261 may turn on or off the lamp in response to the control command of the second controller 280.

The cluster 261 may include a tachometer, speedometer, coolant thermometer, fuel gauge, turn indicator lamp, high beam indicator, warning lamp, seat belt warning light, odometer, shift lever indicator, door open warning light, engine oil warning light, and low oil warning light.

The sound outputter 270 outputs sound at a level corresponding to the control command of the second controller 280, in response to the control command of the second controller 280.

The sound outputter 270 may output warning information as a sound to notify a risk of collision with the obstacle. The sound outputter 270 may be a speaker.

The second controller 280 may control the vehicle to travel at a preset driving speed or at a driving speed input by a user, when the autonomous driving mode is performed.

In the autonomous driving mode, the second controller 280 may autonomously control driving to the destination based on the destination information and current location information. When the autonomous driving is performed, the second controller 280 may recognize a lane and an obstacle on the road by performing image processing with respect to image information acquired by the image acquisition part 210, recognize a lane in which the host vehicle is travelling based on location information about the recognized lane. Also, the second controller 280 may acquire a distance to the recognized obstacle based on obstacle information detected by the obstacle detector 220, and control a lane change, acceleration and deceleration based on the acquired distance to the obstacle.

In the autonomous driving mode, the second controller 280 may also perform an avoidance control for avoiding the obstacle by generating a detour route based on the obstacle information of the obstacle. In this instance, the second controller 280 may control at least one of the brake system 32 or the steering system 42 for avoidance control.

When it is determined that the collision avoidance notification mode is selected while the manual driving mode is performed, the second controller 280 may determine a collision with the obstacle using the image information acquired by the image acquisition part 210 and the obstacle information acquired by the obstacle detector 220, control an output of collision risk information based on the determination on the collision with the obstacle, and perform a collision avoidance or avoidance control. In the manual driving mode, the second controller 280 may control the brake system 32 for collision avoidance.

Also, when it is determined that the collision avoidance notification mode is selected while the manual driving mode is performed, the second controller 280 may recognize the lane and the obstacle on the road by performing image processing with respect to the image information acquired by the image acquisition part 210, recognize the lane in which the host vehicle is travelling based on the location information about the recognized lane, recognize the obstacle based on the recognized lane, and perform the collision avoidance or avoidance control with respect to the recognized obstacle based on the obstacle information detected by the obstacle detector 220.

When controlling the brake system 32 for collision avoidance, the second controller 280 may control at least one of a prefill part 32a, a pre-braking part 32b, or an emergency braking part 32c of the brake system 32 based on time information about a time taken until a collision with the obstacle occurs and relative distance information with respect to the obstacle.

The second controller 280 may control an operation of at least one of the prefill part 32a, the pre-braking part 32b, or the emergency braking part 32c, based on a first braking distance, a second braking distance, a third braking distance and the relative distance information with respect to the obstacle.

The first braking distance is a braking distance to control the prefill part 32a, the second braking distance is a braking distance to control the pre-braking part 32b, and the third braking distance is a braking distance to control and the emergency braking part 32c. Each of the first to third braking distances may be preset.

When it is determined that the collision may not be avoided by braking, the second controller 280 may acquire a direction of the obstacle and control the steering system 42.

When the driving speed of the vehicle is less than or equal to a reference speed, the second controller 280 may perform the avoidance control for avoiding the collision with the obstacle by braking.

When the driving speed of the vehicle is greater than the reference speed, the second controller 280 may perform the avoidance control for avoiding the collision with the obstacle by steering.

The second controller 280 may control at least one of the display 260 or the sound outputter 270 to output warning information for alerting the collision with the obstacle.

The second controller 280 may acquire the driving speed of the vehicle based on a plurality of wheel speeds detected by the plurality of wheel speed sensors, and also acquire the driving speed of the vehicle based on the acceleration detected by the acceleration sensor. Also, the second controller 280 may acquire the driving speed of the vehicle based on the plurality of wheel speeds detected by the plurality of wheel speed sensors and the acceleration detected by the acceleration sensor.

The second controller 280 may acquire a relative speed of the obstacle based on distance change information about the distance information detected by the obstacle detector 220 and speed information about the driving speed of the host vehicle.

Figure 5:
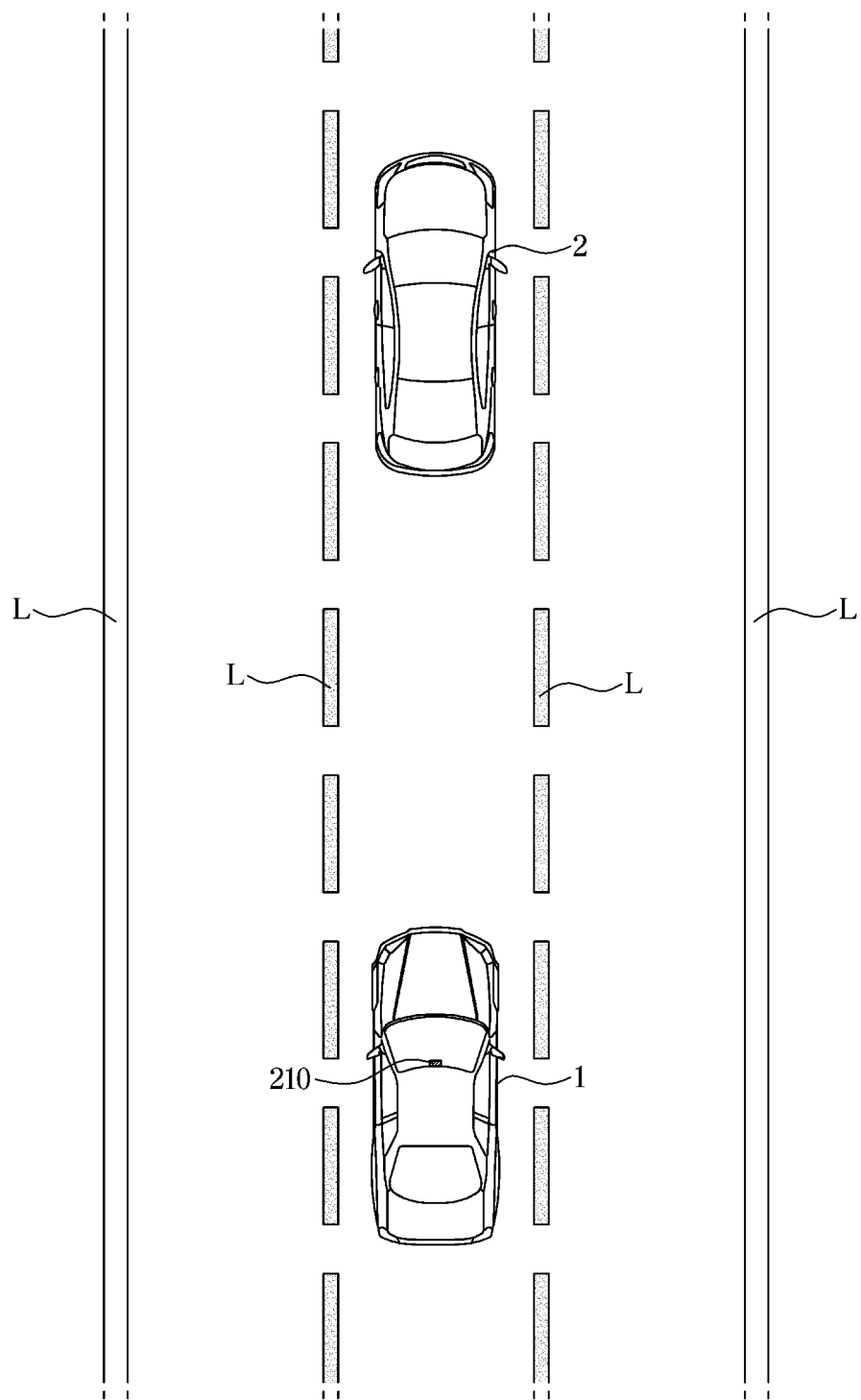
FIG. 5 is a diagram illustrating an example of travelling of a vehicle according to an embodiment.

As shown in FIG. 5, when the host vehicle is a first vehicle 1 and the obstacle is a second vehicle 2, the second vehicle 2 may be located in front of the first vehicle 1. Here, the front of the first vehicle 1 may be a forward direction of the first vehicle 1.

The second controller 280 may recognize a lane L in an image acquired by the image acquisition part 210 of the first vehicle 1, and recognize the second vehicle 2 located in front of the first vehicle 1 based on location information of the recognized lane.

The second controller 280 may acquire distance information about a distance to the second vehicle 2 in front based on distance information detected by the obstacle detector 220, and acquire a relative speed of the second vehicle 2 based on distance change information about a change in distance to the second vehicle 2 and a driving speed of the first vehicle 1.

The second controller 280 may recognize a driving direction of the first vehicle 1 based on image information about the second vehicle 2 acquired by the image acquisition part 210 of the first vehicle 1 and yaw rate information of the first vehicle 1 detected by the yaw rate detector 232, and determine a risk of collision based on the recognized driving direction of the first vehicle 1 and the relative speed of the second vehicle 2. Also, the second controller 280 may control to restrict braking based on the determination on the risk of collision.

The second controller 280 may diagnose a failure of a shift lever 22 and the lever signal receiver 240 based on a position of the shift lever 22 and a signal value of the gear signal received in the lever signal receiver 240, and in response to the failure diagnosis of at least one of the shift lever 22 or the lever signal receiver 240, recognize the driving direction of the first vehicle 1 based on the image information about the second vehicle 2 acquired by the image acquisition part 210 of the first vehicle 1 and the yaw rate information of the first vehicle 1 detected by the yaw rate detector 232.

The second controller 280 may also determine whether the gear signal is received through a shift button provided in the inputter 250, or diagnose a failure of the shift button and the lever signal receiver 240 based on the signal value of the gear signal.

Figure 6:
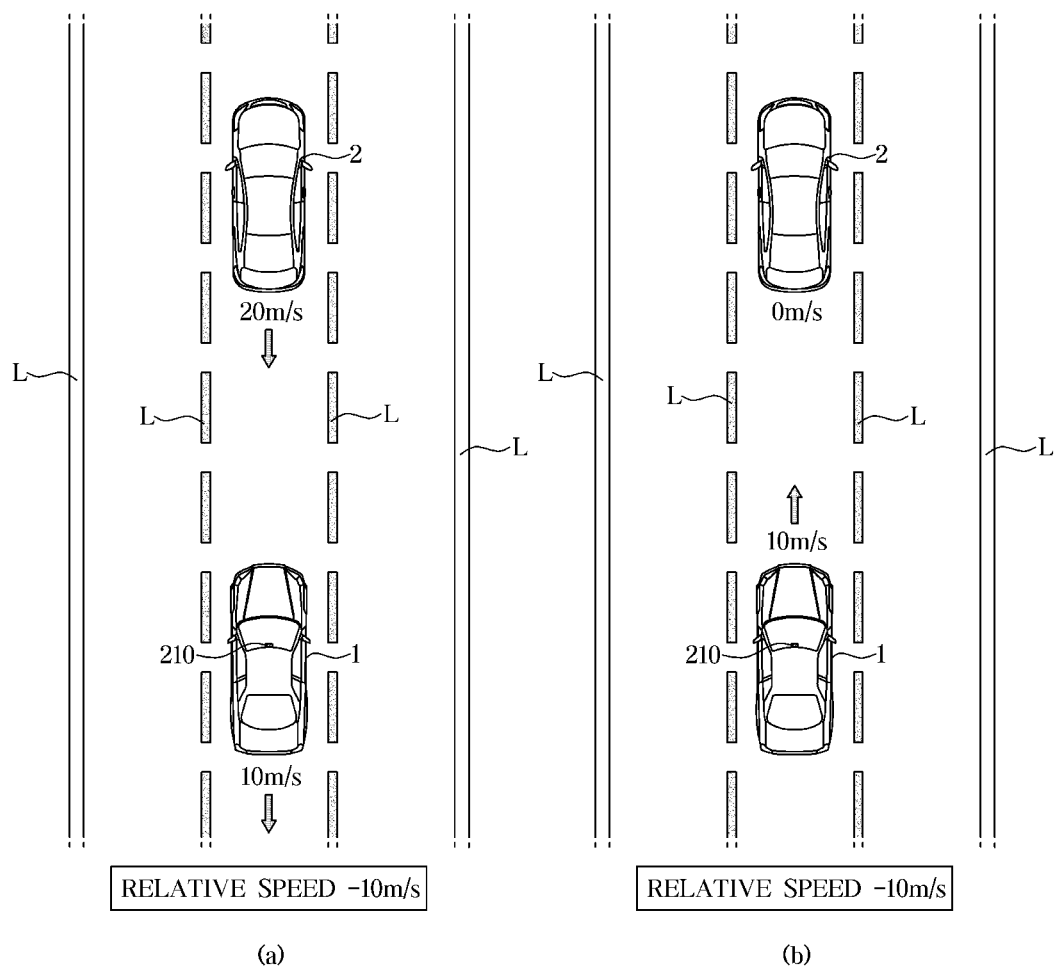
FIG. 6 is a diagram illustrating an example of relative speeds between an obstacle and a vehicle according to an embodiment.

As shown in FIG. 6, in a normal state of the shift lever 22 and the lever signal receiver 240, when the first vehicle 1 moves backward at a driving speed of 10 m/s and the second vehicle 2 located in front of the first vehicle 1 moves backward at a driving speed of 20 m/s, the second controller 280 may recognize a relative speed of the second vehicle 2 with respect to the first vehicle 1 as −10 m/s. Here, (−) may refer to a backward movement.

(−)20 m/s−(−)10 m/s=−10 m/s

In a state where the vehicles are travelling as shown in FIG. 6A, when at least one of the shift lever 22 or the lever signal receiver 240 is in a failure state, the second controller 280 may not recognize a backward gear signal of the second vehicle 2. Accordingly, the second controller 280 may recognize that the second vehicle 2 is in a stationary state based on the driving speed of 10 m/s of the first vehicle 1 and the relative speed of −10 m/s of the second vehicle 2 as shown in FIG. 6B, and also recognize that the first vehicle 1 is moving forward at the driving speed of 10 m/s. When the at least one of the shift lever 22 or the lever signal receiver 240 is in the failure state, an error may occur in recognizing the driving direction of the first vehicle 1, and thus $X$−10 m/s=−10 m/s, $X$=0 m/s The second controller 280 may recognize the driving direction of the first vehicle 1 based on the image information acquired by the image acquisition part 210 of the first vehicle 1 and the yaw rate information of the first vehicle 1 detected by the yaw rate detector 232, which is described with reference to FIGS. 7 and 8.

The second controller 280 may acquire a rotation direction of the first vehicle 1 based on the yaw rate information, acquire an image of the second vehicle 2 in a road image acquired by the image acquisition part 210, and acquire a rotation direction of the acquired image of the second vehicle 2. Also, the second controller 280 may determine whether the acquired rotation direction of the first vehicle 1 is the same as the acquired rotation direction of the image of the second vehicle 2.

Here, the rotation direction of the image of the second vehicle 2 refers to a horizontal moving direction of the second vehicle 2. The horizontal moving direction may be acquired by at least one of a horizontal speed and an angular rate of change.

Figure 7:
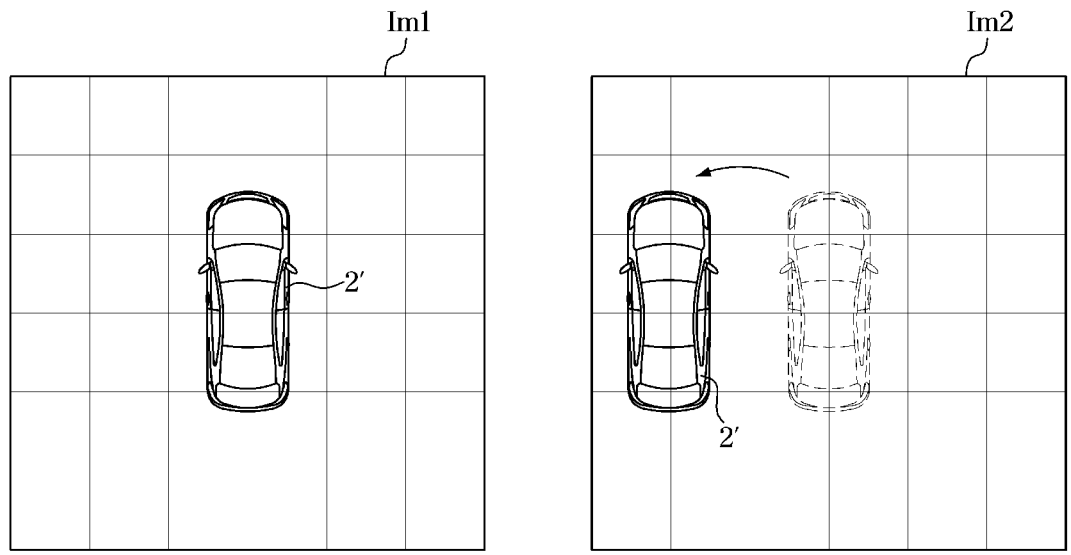
FIGS. 7 and 8 are diagrams illustrating an example of recognizing a moving direction of a vehicle according to an embodiment.
Figure 7:
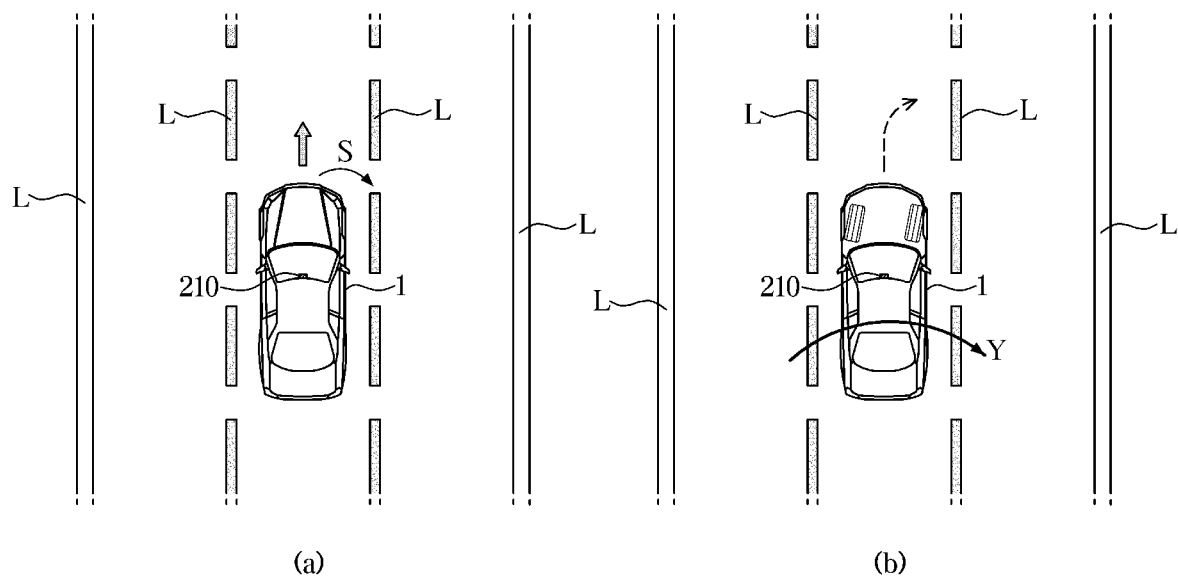

As shown in FIG. 7, when it is determined that the acquired rotation direction of the first vehicle 1 is different from the rotation direction of the image of the second vehicle 2', the second controller 280 determines that a moving direction of the first vehicle 1 is a forward direction.

Figure 8:
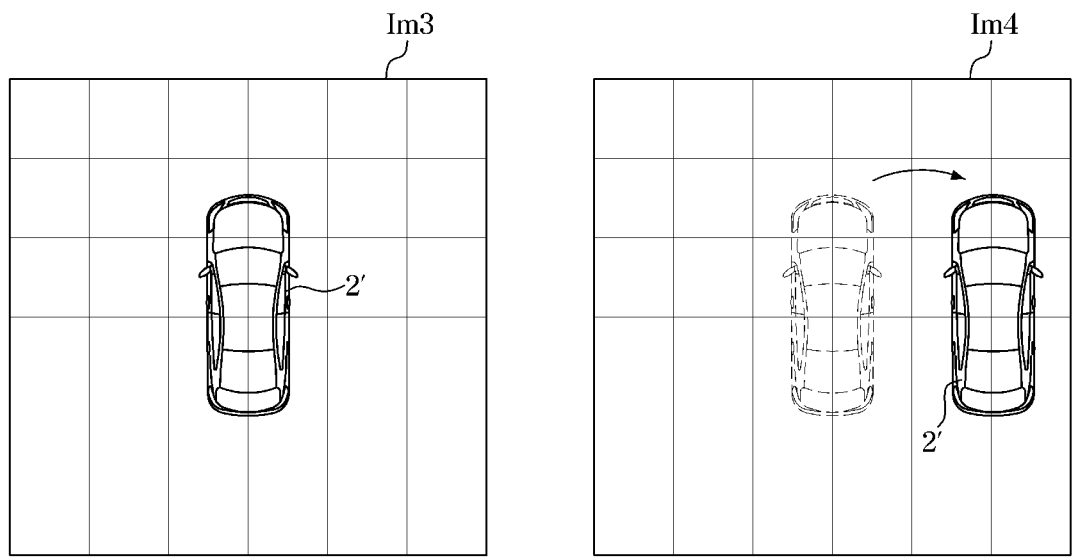
Figure 8:
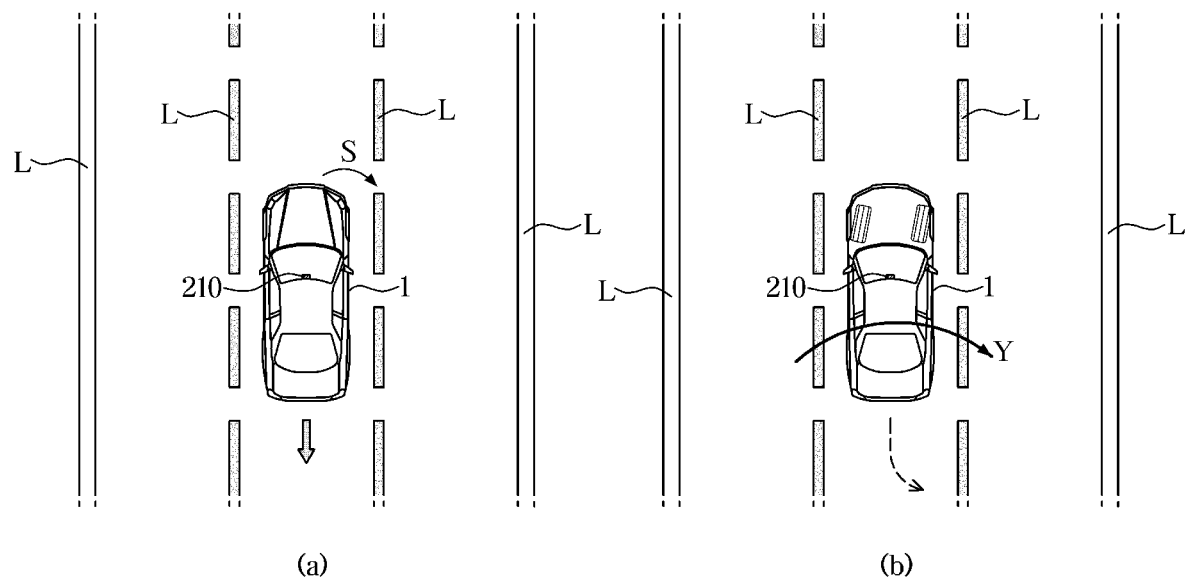

As shown in FIG. 8, when it is determined that the acquired rotation direction of the first vehicle 1 is the same as the rotation direction of the image of the second vehicle 2', the second controller 280 determines that the moving direction of the first vehicle 1 is a backward direction.

That is, when the first vehicle 1 rotates in a first rotational direction while travelling in the forward direction, the second vehicle 2' may appear to rotate in a second rotational direction. When the first vehicle 1 rotates in the first rotational direction while travelling in the backward direction, the second vehicle 2' may appear to rotate in the first rotational direction.

The first rotational direction may be opposite to the second rotational direction. For example, when the first rotational direction is clockwise, the second rotational direction may be counterclockwise, and when the first rotational direction is counterclockwise, the second rotational direction may be clockwise.

The second controller 280 may also acquire the rotation direction of the vehicle based on steering angle information detected by a steering angle detector (not shown).

When it is determined that the driving direction of the first vehicle 1 is the backward direction, the second controller 280 controls to restrict braking, and when it is determined that the driving direction of the first vehicle 1 is the forward direction, the second controller 280 acquires information about a distance to the second vehicle 2' based on distance information detected by the obstacle detector 220 and controls braking based on the acquired information about the distance and preset braking distance information.

The second controller 280 may also recognize the driving direction of the first vehicle 1 when a relative speed of the second vehicle 2' reaches a preset relative speed.

The second controller 280 may determine whether the second vehicle 2' is in a stationary state based on the information about the distance to the second vehicle 2' and speed information of the first vehicle 1. When it is determined that the second vehicle 2' is in the stationary state, the second controller 280 may recognize the moving direction, i.e., the driving direction of the first vehicle 1 based on the rotation direction of the first vehicle 1 and the rotation direction of the image of the second vehicle 2' in the road image.

The second controller 280 may recognize an object in a stationary state in the road image acquired by the image acquisition part 210, and also recognize the moving direction, i.e., the driving direction of the first vehicle 1 based on the rotation direction of the first vehicle 1 and a rotation direction of an image of the object in the stationary state in the road image.

The object in the stationary state may include an obstacle in a stationary state such as a road sign, a traffic light, a street lamp, a median barrier, a speed bump, and the like.

When the shift lever 22 or the lever signal receiver 240 is diagnosed as failure, the second controller 280 may control the display 260 to display information about the failure in the shift lever 22 or the lever signal receiver 240.

Also, when the shift lever 22 or the lever signal receiver 240 is diagnosed as failure, the second controller 280 may control the display 260 to display information about the moving direction of the vehicle such as backward information R corresponding to the backward direction and forward information D corresponding to the forward direction, based on the image information and the yaw rate information.

The display 260 may be controlled to display the information about the failure in the shift lever 22 or the lever signal receiver 240.

When it is determined that both the shift lever 22 and the lever signal receiver 240 are in a normal state, the second controller 280 may recognize a moving direction of a vehicle body of the vehicle based on the gear signal received in the lever signal receiver 240.

The second controller 280 may control the emergency braking part 32c when controlling braking or controlling to restrict braking.

The brake system 32 may generate a braking force in response to a braking signal of the second controller 280.

The brake system 32 may include the prefill part 32a, the pre-braking part 32b, and the emergency braking part 32c.

The prefill part 32a may enter a braking preparation state in response to a control command from the second controller 280.

The pre-braking part 32b performs an automatic braking at a first preset deceleration in response to the control command of the second controller 280.

The pre-braking part 32b performs a partial braking to complete preliminary preparation for emergency braking.

The emergency braking part 32c performs an automatic braking to achieve a second preset deceleration in response to the control command of the second controller 280.

Here, the second preset deceleration may be a deceleration corresponding to a maximum braking pressure generated when a collision with an obstacle is not avoidable.

The emergency braking part 32c may perform the automatic braking at the deceleration corresponding to the maximum braking pressure, even when a brake pedal is pressed.

The steering system 42 may perform steering for adjusting a driving path in response to a steering signal of the second controller 280.

The storage 281 may store information about a braking distance preset for each braking part of the brake system 32.

More specifically, the storage 281 may store information about a first braking distance of the prefill part 32a, a second braking distance of the pre-braking part 32b, and a third braking distance of the emergency braking part 32c.

The storage 281 may store information about a type and loudness of sound corresponding to the warning about the risk of collision.

The storage 281 may be implemented with at least one of a non-volatile memory such as cache, read only memory (ROM), programmable read only memory (PROM), erasable programmable read only memory (EPROM), electrically erasable programmable read only memory (EEPROM) and flash memory, a volatile memory such as a random access memory (RAM) and storage medium such as hard disk drive (HDD) and compact disc read only memory (CD-ROM), without being limited thereto.

The storage 281 may be a memory implemented as a chip separated from the processor described in relation to the second controller 280, or a single chip integrated into the processor.

As is apparent from the above, according to the embodiments of the disclosure, the DAS and the vehicle including the same can determine a collision with a second vehicle based on image information about the second vehicle acquired by a first vehicle which is a host vehicle, yaw rate information of the first vehicle, and a relative speed with respect to the second vehicle, thereby improving an accuracy of collision determination.

The DAS and the vehicle including the same can determine whether to brake the vehicle after accurately recognizing a driving direction of the first vehicle which is the host vehicle, based on the image information about the second vehicle acquired by the first vehicle and the yaw rate information of the first vehicle, thereby flexibly responding to a collision with another vehicle. Accordingly, the occurrence of traffic accidents may be reduced and the driver's safety may be improved.

The DAS and the vehicle including the same can accurately determine whether the host vehicle drives back even in the event of failure of a shift lever due to a gear lever, thereby reducing a risk of accident.

The DAS and the vehicle including the same can perform a braking control depending on a likelihood of collision with another vehicle in front without adding a hardware configuration, thereby preventing an increase in vehicle costs and improving a safety of vehicle.

As described above, the DAS and the vehicle including the same can have improved quality and marketability and increase user satisfaction and product competitiveness.

Embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include read only memory (ROM), random access memory (RAM), magnetic tapes, magnetic disks, flash memories, and optical recording medium.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A driver assistance system, comprising:
    an image acquisition part configured to acquire image information about an obstacle;
    an obstacle detector configured to detect distance information about a distance to the obstacle;
    a controller configured to acquire relative speed information of the obstacle based on the detected distance information and speed information about a driving speed detected by a speed detector, and control braking based on the acquired relative speed information,
    wherein, when controlling the braking, the controller is configured to recognize a rotation direction of the vehicle body based on a yaw rate of the vehicle body detected by a yaw rate detector, recognize a position change of the obstacle in in an image based on the acquired image information, recognize whether a moving direction of the vehicle body is a backward direction based on the recognized rotation direction of the vehicle body and the recognized position change of the obstacle, and when it is determined that the moving direction of the vehicle body is the backward direction, restrict the braking,
    wherein the controller is configured to recognize a rotation direction of the obstacle corresponding to the recognized position change of the obstacle and when the rotation direction of the obstacle is the same as the recognized rotation direction of the vehicle body, recognize that the moving direction of the vehicle body is the backward direction.

2. The driver assistance system of claim 1, wherein the controller is configured to acquire lane information and obstacle information on a road based on the acquired image information, and recognize the position change of the obstacle based on the acquired lane information and the acquired obstacle information, and
    the obstacle is a vehicle located in front of the vehicle body.

3. The driver assistance system of claim 2, wherein the controller is configured to determine whether the vehicle is in a stationary state based on the detected distance information and the detected speed information, and when it is determined that the vehicle is in the stationary state, recognize a position change of the vehicle.

4. The driver assistance system of claim 1, wherein the controller is configured to acquire object information in a stationary state based on the acquired image information, and recognize the position change of the obstacle based on the acquired object information in the stationary state.

5. The driver assistance system of claim 1, wherein,
when the rotation direction of the obstacle is different from the recognized rotation direction of the vehicle body, the controller is configured to recognize that the moving direction of the vehicle body is a forward direction.

6. The driver assistance system of claim 1, wherein the controller is configured to recognize the moving direction of the vehicle body based on a gear signal received from a shift lever, when the shift lever is in a normal state, and
when the shift lever is in a failure state, recognize the moving direction of the vehicle body based on the detected yaw rate of the vehicle body and the image information.

7. A driver assistance system, comprising:
an image acquisition part configured to acquire image information about an obstacle;
a controller configured to, when a shift lever is diagnosed as failure, recognize a rotation direction of the vehicle body based on a yaw rate of the vehicle body detected by a yaw rate detector, recognize a position change of the obstacle in an image based on the acquired image information, and recognize whether a moving direction of the vehicle body is a backward direction or a forward direction based on the recognized rotation direction of the vehicle body and the recognized position change of the obstacle.

8. The driver assistance system of claim 7, further comprising:
an obstacle detector configured to detect distance information about a distance to the obstacle; and
wherein, when it is determined that the moving direction of the vehicle body is the backward direction, the controller is configured to acquire relative speed information of the obstacle based on the detected distance information and speed information about a driving speed detected by a speed detector, and control to restrict braking based on the acquired relative speed information.

9. The driver assistance system of claim 7, wherein the controller is configured to recognize a rotation direction of the obstacle corresponding to the recognized position change of the obstacle,
when the rotation direction of the obstacle is different from the recognized rotation direction of the vehicle body, recognize that the moving direction of the vehicle body is the forward direction, and
when the rotation direction of the obstacle is the same as the recognized rotation direction of the vehicle body, recognize that the moving direction of the vehicle body is the backward direction.

10. The driver assistance system of claim 7, wherein the controller is configured to acquire lane information and obstacle information on a road based on the acquired image information, and recognize the position change of the obstacle based on the acquired lane information and the acquired obstacle information.

11. A vehicle, comprising:
a brake system;
an image acquisition part configured to acquire image information about an obstacle;
and
a driver assistance system configured to recognize a rotation direction of the vehicle body based on a yaw rate of the vehicle body detected by a yaw rate detector, recognize a position change of the obstacle in an image based on the acquired image information, recognize whether a moving direction of the vehicle body is a backward direction or a forward direction based on the recognized rotation direction of the vehicle body and the recognized position change of the obstacle, and when it is determined that the moving direction of the vehicle body is the backward direction, control to restrict braking of the brake system,
wherein the driver assistance system is configured to recognize a rotation direction of the obstacle corresponding to the recognized position change of the obstacle and when the rotation direction of the obstacle is the same as the recognized rotation direction of the vehicle body, recognize that the moving direction of the vehicle body is the backward direction.

12. The vehicle of claim 11, further comprising:
an obstacle detector configured to detect distance information about a distance to the obstacle; and
wherein, when it is determined that the moving direction of the vehicle body is the backward direction, the driver assistance system is configured to acquire relative speed information of the obstacle based on the detected distance information and speed information about a driving speed detected by a speed detector, and control to restrict the braking based on the acquired relative speed information.

13. The vehicle of claim 11, further comprising:
a shift lever; and
a lever signal receiver configured to receive a gear signal from the shift lever,
wherein the driver assistance system is configured to diagnose a failure of at least one of the shift lever or the lever signal receiver based on gear information received from the lever signal receiver, and when the at least one is diagnosed as failure, recognize the moving direction of the vehicle body based on the recognized rotation direction of the vehicle body and the recognized position change of the obstacle.

14. The vehicle of claim 13, wherein the driver assistance system is configured to recognize the moving direction of the vehicle body based on the gear signal received in the lever signal receiver, when the shift lever is in a normal state.

15. The vehicle of claim 11, wherein the driver assistance system is configured to acquire lane information and obstacle information on a road based on the acquired image information, and recognize the position change of the obstacle based on the acquired lane information and the acquired obstacle information, and
the obstacle is another vehicle located in front of the vehicle body.

16. The vehicle of claim 15, wherein the driver assistance system is configured to acquire object information in a stationary state based on the acquired image information, and recognize the position change of the obstacle based on the acquired object information in the stationary state.

17. The vehicle of claim 11, wherein,
when the rotation direction of the obstacle is different from the recognized rotation direction of the vehicle body, the driver assistance system is configured to recognize that the moving direction of the vehicle body is the forward direction.

\* \* \* \* \*